(12) United States Patent
Kuon

(10) Patent No.: US 7,027,774 B2
(45) Date of Patent: Apr. 11, 2006

(54) METHOD FOR DIRECT VOICE TELEPHONE CALL USING BLUETOOTH TERMINAL

(75) Inventor: Bo-Gun Kuon, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 572 days.

(21) Appl. No.: 10/154,819

(22) Filed: May 28, 2002

(65) Prior Publication Data
US 2002/0183050 A1 Dec. 5, 2002

(30) Foreign Application Priority Data
May 30, 2001 (KR) .............................. 2001-30062

(51) Int. Cl.
*H04Q 7/32* (2006.01)

(52) U.S. Cl. .................... 455/41.2; 455/41.3; 455/445

(58) Field of Classification Search ................. 370/255, 370/330; 455/553.1
See application file for complete search history.

(56) References Cited

U.S. PATENT DOCUMENTS

| | | | |
|---|---|---|---|
| 6,697,638 B1 * | 2/2004 | Larsson et al. .......... 455/553.1 |
| 6,751,200 B1 * | 6/2004 | Larsson et al. ............. 370/255 |
| 2002/0012329 A1 * | 1/2002 | Atkinson et al. ........... 370/330 |
| 2003/0133423 A1 * | 7/2003 | LaDue ....................... 370/330 |

* cited by examiner

*Primary Examiner*—Fan Tsang
*Assistant Examiner*—Lisa Hashem
(74) *Attorney, Agent, or Firm*—Fleshner & Kim, LLP

(57) ABSTRACT

A method for direct voice telephone call using a bluetooth terminal. A direct voice telephone call between bluetooth terminals is made using a bluetooth protocol stack which is constructed so as to make the voice telephone call easy and the voice telephone call can be made conveniently. Resources can be recycled by using a vocoder of wireless mobile communication terminal when the voice telephone call is embodied. The method includes a step of trying to set a call, a step of connecting an asynchronous connection-less (ACL), a step of connecting a synchronous connection-oriented (SCO) when the ACL is connected, and a step of performing the voice telephone call when the SCO is connected.

26 Claims, 4 Drawing Sheets

OUTGOING=CALL-ORIENTING
INCOMING=CALL-TERMINATED

METHOD FOR DIRECT VOICE TELEPHONE CALL USING BLUETOOTH TERMINAL

BACKGROUND OF THE INVENTION

1. Field of the Invention

The present invention relates to a bluetooth wireless technology, and particularly, to a method for direct voice telephone call between bluetooth terminals.

2. Background of the Related Art

Bluetooth is a technology for connecting a portable device which can be connected to from all over the world and a network device with a size of 9 mm×9 mm as 100 MW. The bluetooth technology is a radio standard of short wave length depending on a radio link (2.4 GHs Information System Management Open Band) within 10 m to 100 m range, and concentrates on a communication between internet devices. The bluetooth technology partitions frequency bands to transmit data, and transmits frequency to the partitioned frequency bands as dividing the frequency. The bluetooth is also used for moving data from one channel to the other channel utilizing the above spectrum.

Further, the bluetooth technology is able to bind eight devices in a network with a piconet. The bluetooth technology can be applied to various devices such as voice transmission or the Internet because it supports all synchronous/asynchronous applications.

The network of the bluetooth (topology) can be constructed as a point-to-point network, or a point-to-multi-points network, any unit of a piconet can be connected to the other piconet to construct a scatternet. The core of the bluetooth application is to make interface of a digital apparatus wireless. There are various applications based on the bluetooth technology. Presently, applications using the bluetooth technology are cellular phone application, wireless headset, and three-in-one phone.

The cellular phone application is basically an application of the bluetooth technology and takes the advantage of the bluetooth technology. Specifically, the cellular phone application can be performed using an audio channel, which is the biggest advantage of the bluetooth technology. In addition, the wireless headset is the first application in the early stage of the implementation of bluetooth technology. A user is able to speak on the phone using the wireless headset when the cellular phone is in a bag or in a pocket, and the wireless headset can be used as a hands free device while the user drives a car. Further, the three-in-one phone is a phone system capable of performing three functions when the bluetooth technology is installed on one cellular phone. The cellular phone in which the bluetooth technology is installed can be used as a wireless phone which is connected to a wired phone in a house, it can also be used as an intercom or a walkie-talkie talking to a person within a close range.

FIG. 1 is a diagram showing a standard protocol stack of the bluetooth technology. The protocol stack comprises a service discovery protocol (SDP), a connection-less (CL), a connection-oriented (CO), a logical link control and adaptation layer protocol (L2CAP), a link management protocol (LMP), a synchronous connection-oriented (SCO), and an asynchronous connection-less (ACL).

A terminal including the bluetooth protocol stack, as shown in FIG. 1, uses the CL and CO in a cordless telephone profile, and also uses CO in an intercom profile as a signaling path. In addition, the terminal synchronizes audio data through the SCO connection. A telephony control specification (TCS)-binary comprises a call control (CC), a connection-less (CL) TCS, group management (GM) and protocol discrimination modules.

A cordless telephone profile among the TCS—binary based profiles of the bluetooth uses the CL TCS and the CO as the signal path, and synchronizes audio data through an SCO connection. The TCS—binary based profile comprises a call control (CC), the CL TCS, the GM, and the protocol discrimination modules (not shown). The LMP is a link management protocol layer, SDP is a service discovery protocol layer, and L2CAP is the logical link control and adaptation layer protocol layer in FIG. 1.

In addition, there are some call status states of the voice communication when it is made by the above bluetooth protocol stack such as a null, an active, a disconnect request, a disconnect indication. The call status further includes a release request, a call initiated, an overlap sending, an outgoing call processing, a call present, a call received, a connect request, and an overlap receiving states.

Call setting and releasing the set call processes in a bluetooth terminal including the above bluetooth protocol stack are shown in FIG. 1. These two call status states will be described as follows with reference to FIGS. 2A and 2B.

FIG. 2A is a flow chart showing a call setting process in the bluetooth terminal including the bluetooth protocol stack shown in FIG. 1. An outgoing terminal transmits a setup message to an incoming terminal in order to set a call (step S11). The incoming terminal which received the setup message transmits a setup acknowledge message to the outgoing terminal (step S12).

The outgoing terminal which received the setup acknowledge message transmits information needed to set the call to the incoming terminal (step S13). There are more than one kind of information which is needed to set the call. When the information is transmitted to the incoming terminal, the incoming terminal and the outgoing terminal generate a signal and an alarming sound for call setting. Subsequently, the incoming terminal which transmits the alarming sound to the outgoing terminal transmits a connecting message to the outgoing terminal (step S14~step S16). The outgoing terminal which received the connecting message transmits a connecting acknowledge message to the incoming terminal (step S17). When the connecting acknowledge message is transmitted to the outgoing terminal, the call setting process is completed.

FIG. 2B is a flow chart showing a process for releasing the set call in the bluetooth terminal including the bluetooth protocol stack shown in FIG. 1. The outgoing terminal transmits a call disconnecting message to the incoming terminal (step S21). The incoming terminal which received the call disconnecting message transmits a call releasing message to the outgoing terminal, and the outgoing terminal after received the call releasing message transmits a call releasing complete message to the incoming terminal finally (step S22~step S23).

However, in the general bluetooth protocol stack described above, the bluetooth is for embodying the service using various applications. Therefore, the structure of the bluetooth is complex to perform only the voice communication. Further, the vocoder standard for voice communication and the vocoder standard used by a wireless mobile communication terminal, which supports the bluetooth are different from each other. Thus, resources are wasted when a mobile communication terminal, which is capable of direct voice communication by the bluetooth is embodied, and complexity and redundancy are increased.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide a method for direct voice telephone call using a bluetooth terminal that embodies direct voice telephone call between bluetooth terminals through a bluetooth protocol stack which is constructed in a way to make a voice communication easy.

To achieve the object of the present invention, as embodied and broadly described herein, a method for direct voice telephone call using a bluetooth terminal is provided. The method comprises a step of trying to set a call, a step of connecting an asynchronous connection-less (ACL), a step of connecting a synchronous connection-oriented (SCO) when the ACL is connected and a step of making a voice telephone call when the SCO is connected.

The foregoing and other objects, features, aspects and advantages of the present invention will become more apparent from the following detailed description of the present invention when taken in conjunction with the accompanying drawings.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention and are incorporated in and constitute a part of this specification, illustrate preferred embodiments of the invention and together with the description serve to explain the principles of the invention.

DETAILED DESCRIPTION OF PREFERRED EMBODIMENTS

Reference will now be made in detail to the preferred embodiments of the present invention, examples of which are illustrated in the accompanying drawings.

The present invention is to apply a vocoder standard of the CDMA (QCELP/EVRC) and a vocoder standard of a GSM (G.723.1) to a wireless mobile communication terminal (for example, a CDMA (Code Division Multiple Access) terminal adopting chips such as MSM 3300/5100/5500) and resources of the terminal.

Specifically, a bluetooth vocoder standard (log-PCM or CVSD) is an option, and a voice data packet is transmitted through a voice field of HV (High-quality Voice) 1 to 3 types in the packet or transmitted through a voice/data field of DV (Data Voice) type in the packet.

Figure 1:
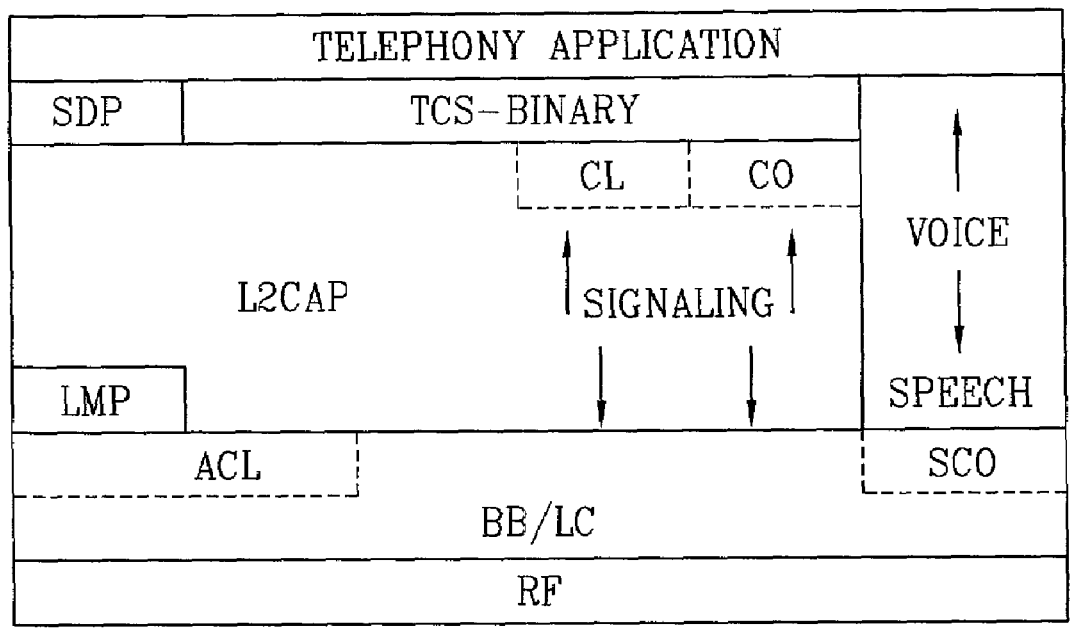
FIG. 1 is a diagram showing a standard protocol stack of a general bluetooth.
Figure 2A:
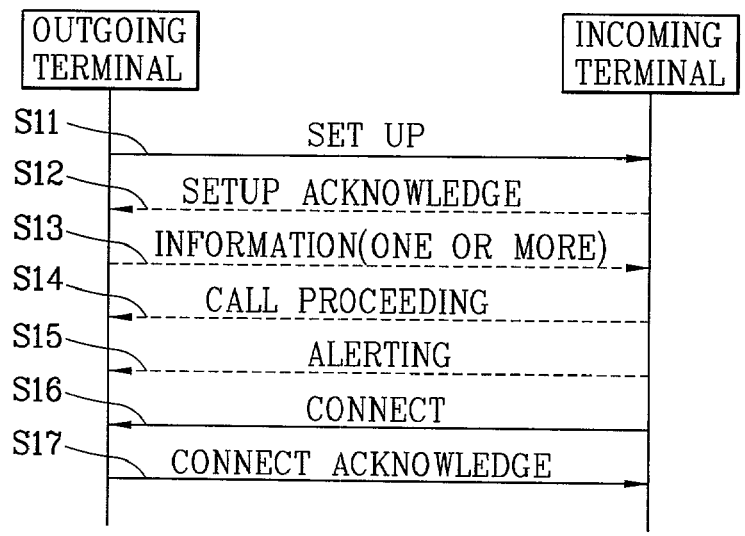
FIG. 2A is a diagram showing a process of setting a call of a bluetooth terminal, which includes a general bluetooth protocol stack.
Figure 2B:
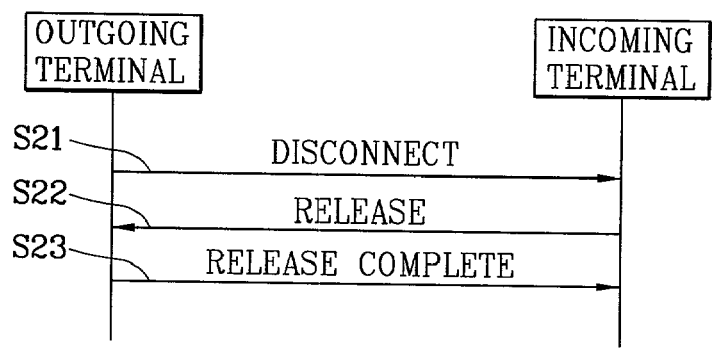
FIG. 2B is a diagram showing a process of releasing the connected call in the bluetooth terminal, which includes the general bluetooth protocol stack.
Figure 3:
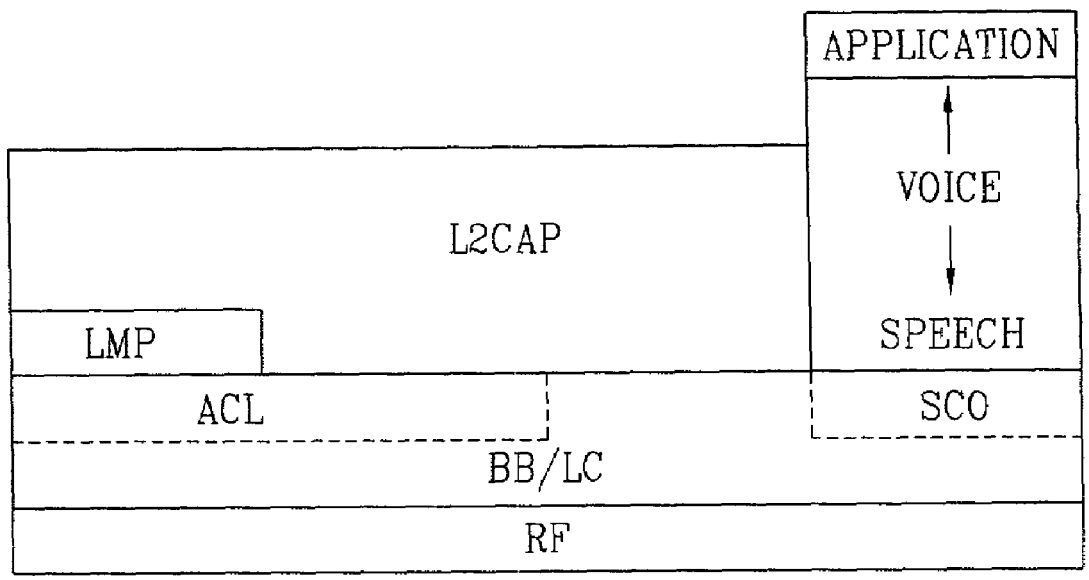
FIG. 3 is a diagram showing a preferred embodiment of a bluetooth protocol stack for embodying a direct voice telephone call according to the present invention.

FIG. 3 is a diagram showing a bluetooth protocol stack for making a direct voice telephone call according to the present invention. The bluetooth protocol stack includes a synchronous connection-oriented (SCO) for forming a voice data path, an asynchronous connection-less (ACL) for connecting the SCO, and a link management protocol (LMP) for connecting the SCO/ACL. The SCO connecting method is mainly used for transmitting voice, and the ACL connecting method is mainly used for transmitting data.

Figure 4A:
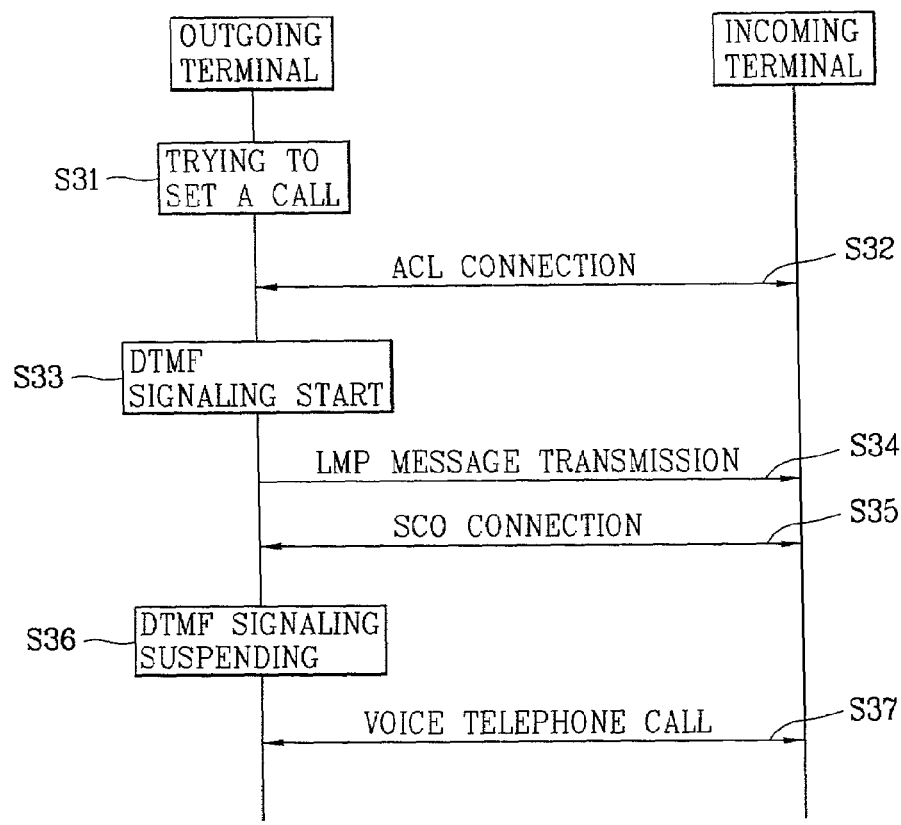
FIG. 4A is a block diagram showing a process of setting a call for making a direct voice telephone call between bluetooth terminals including the bluetooth protocol stack according to the present invention.

A call setting and a set call releasing processes of the bluetooth terminal including the bluetooth protocol stack will be described with reference to FIGS. 4A and 4B. FIG. 4A is a block diagram showing a process of setting a call for making a direct voice telephone call between bluetooth terminals, which include the bluetooth protocol stack according to the present invention. An outgoing terminal tries to set a call for voice telephone call (step S31). First, a user of the outgoing terminal tries to connect a call by selecting an incoming terminal in a terminal list in a piconet or in a scatternet of the bluetooth terminal, which is able to make a voice telephone call, by mapping the incoming terminal, or inputting a telephone number of the incoming terminal. The terminal list in the piconet or in the scatternet of the bluetooth terminal is decided by the user of the terminal, and the bluetooth terminal may be a master terminal or a slave terminal by itself.

Although, bluetooth devices have same equivalent hardware, a bluetooth device may be a master device or a slave device depending on whether or not it opens a communication initially. The bluetooth device that initiates a communication becomes a master to manage the communication in the piconet.

The master bluetooth terminal makes a list of slave terminals connected to the NET and the other master terminal of which the above bluetooth terminal is a slave terminal through processes of page, page scan, inquiry, and inquiry scan.

When the outgoing terminal tries to call connect, the outgoing terminal connects the ACL to the incoming terminal (step S32). The ACL connection is requited for connecting the SCO. There are two methods for connecting the ACL, one is "auto connection", and the other is a connection, which requires additional information related to a security. The auto connection is a method that the ACL is connected whenever a connection request is received from outside. The connection required additional security information is a method in which a pin code, that is, a password is inputted. A link key is generated using the inputted password, and the connection is made through a coding process. The process of connecting ACL is the same as that of the conventional art.

When the ACL is connected to the incoming terminal, and outgoing terminal starts signaling for a dual tone multi frequency (DTMF) signal (step S33). The DTMF signal is generated when a call setting attempt is generated in the outgoing terminal. Further, it is a signal generated when a button on a general telephone is pushed and transmitted to a telephone office.

When the signaling for the DTMF signal is started, the outgoing terminal transmits an LMP message (LMP_sco_l-ing_req) to the incoming terminal in order to try to connect SCO with the incoming terminal (step S34). The packet type transmitted to the incoming terminal for connecting the SCO at the start of signaling for the DTMF signal is HV1, HN2, HV3 and DV. The packet of DV type is divided into a voice field and a data field. The voice field or the data field may be used, or two fields may be concurrently used. In addition, the user of the terminal can choose the field to be used on the menu of the terminal.

Furthermore, the LMP message (LMP_sco_ling_req) transmitted from the outgoing terminal to the incoming terminal for forming the SCO connection includes various fields, such as an SCO handle, a timing control flags, Dsco, SCO packet, and an air mode. Especially, in case of the air mode, m-law log, A-law log, and CVSD, which are the vocoder standards of the bluetooth are defined as 0, 1, 2 respectively, and 3~255 are in booked states.

The present invention decides what algorithm is applied to restore the encoded data by classifying the voice data format transmitted through the SCO connection after including the vocoder standard applied to the conventional mobile communication terminal in the air mode. Further, the incoming terminal denies the SCO connection with the outgoing terminal in case that the outgoing terminal uses the vocoder standard that is not supported by the incoming terminal when the outgoing terminal tries to connect SCO. The SCO connection can be connected only when the ACL is connected, and three SCOs can be connected for each ACL connection.

When the LMP message (LMP_sco_ling_req) is transmitted to the incoming terminal, the SCO connection is made between the outgoing terminal and the incoming terminal through a predetermined process (step S35). The process of connecting the SCO is the same as that of the conventional art. After the SCO is connected to the incoming terminal, the outgoing terminal suspends the signaling for the DTMF signal and perform the voice telephone call with the incoming terminal (step S36 and step S37).

Figure 4B:
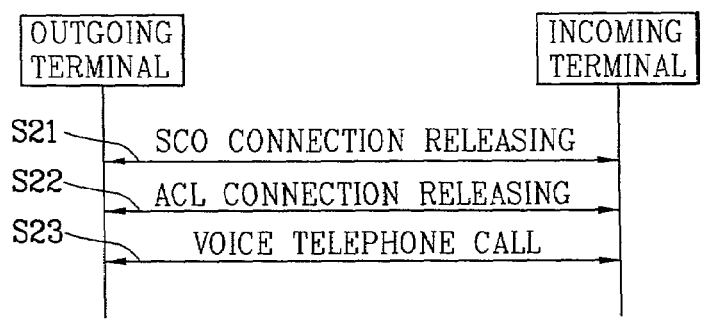
FIG. 4B is a diagram showing a process of releasing the connected call for making a direct voice telephone call between the bluetooth terminals including the bluetooth protocol stack according to the present invention.

FIG. 4B is a diagram showing a process of releasing a set call for making a direct voice telephone call between the bluetooth terminals including the bluetooth protocol stack. The call releasing process is reversed process of the call setting process. The terminal that received a call releasing command terminates the SCO connection, and closes the ACL connection to release the connected call (step S41~step S43).

As described above, the method for direct voice telephone call uses the bluetooth terminal, the direct voice telephone call between the bluetooth terminals can be made easily by minimizing the bluetooth protocol stack.

Further, the vocoder of the wireless mobile communication terminal is used in the voice telephone call between the bluetooth terminals. Therefore, it is convenient to make the voice telephone call and the resources can be recycled.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for performing a direct voice telephone call between bluetooth terminals, comprising:
   selecting, from an outgoing bluetooth terminal, an incoming bluetooth terminal to perform the direct voice telephone call with;
   establishing a communication channel between the outgoing and incoming bluetooth terminals without using a connection-less (CL) layer, connection-orientated (CO) layer and service discovery protocol (SDP) of a bluetooth protocol stack by connecting an asynchronous connection-less (ACL) layer of the outgoing bluetooth terminal with an ACL layer of the incoming bluetooth terminal, and connecting a synchronous connection-less (SCO) layer of the outgoing bluetooth terminal with an SCO layer of the incoming bluetooth terminal after the ACL layers of the outgoing and incoming bluetooth terminals are connected; and
   performing the direct voice telephone call when the SCO layers of the outgoing and incoming bluetooth terminals are connected.

2. The method of claim 1, wherein selecting the bluetooth incoming terminal is performed by selecting a bluetooth terminal from a terminal list in a piconet or in a scatternet that can perform the direct voice telephone call.

3. The method of claim 1, further comprising mapping a selected incoming bluetooth terminal with a telephone number or inputting a telephone number.

4. The method of claim 1, further comprising applying a vocoder standard of a code division multiple access (CDMA) and a vocoder standard of a global system for mobile communication (GSM) of the bluetooth terminals.

5. The method of claim 1, further comprising adopting a bluetooth vocoder standard as an option.

6. The method of claim 1, further comprising transmitting a voice data packet through a voice field of a predetermined type in a packet.

7. The method of claim 6, wherein the voice data packet is transmitted through a voice or data field of a predetermined type in the packet.

8. The method of claim 1, further comprising starting a dual tone multi frequency (DTMF) signal when the ACL is connected.

9. The method of claim 1, further comprising transmitting from the outgoing bluetooth terminal a link management protocol (LMP) message to the incoming terminal simultaneously with the start of signaling for the DTMF signal.

10. The method of claim 1, wherein the SCO connection is made after the ACL layers of the outgoing and incoming bluetooth terminals are connected.

11. The method of claim 9, further comprising:
    suspending signaling for the DTMF signal when the SCO layers of the outgoing and incoming bluetooth terminals are connected; and performing the direct voice telephone call between the outgoing and incoming bluetooth terminals when the signaling is suspended.

12. The method of claim 1, wherein the outgoing and incoming bluetooth terminals comprise a terminal in a piconet or scatternet in a bluetooth system.

13. The method of claim 1, wherein the bluetooth protocol stack only includes:
   an RF layer;
   a BB/LC layer;
   the ACL layer;
   the SCO layer;
   the LMP;
   a logical link control and adoption layer protocol; and
   an upper application layer.

14. The method of claim 1, further comprising releasing a connected call through processes that are reverse to establishing the communication channel.

15. A method for performing a direct voice telephone call between bluetooth terminals, comprising:
   selecting, from an outgoing bluetooth terminal, an incoming bluetooth terminal to perform the direct voice telephone call with;
   establishing a communication channel between the outgoing and incoming bluetooth terminals without using a connection-less (CL) layer, connection-orientated (CO) layer and service discovery protocol (SDP) of a bluetooth protocol stack by connecting an asynchronous connection-less (ACL) layer of the outgoing bluetooth terminal with an ACL layer of incoming bluetooth terminal, starting a dual tone multi frequency (DTMF) signal when the ACL is connected, and connecting a synchronous connection-less (SCO) layer of the outgoing bluetooth terminal with an SCO of the incoming bluetooth terminal after the ACL layers of the outgoing and incoming bluetooth terminals are connected, and suspending signaling for the DTMF signal when the SCO layers of the outgoing and incoming bluetooth terminals are connected; and
   performing the direct voice telephone call when the SCO layers of the outgoing and incoming bluetooth terminals are connected.

16. The method of claim 15, wherein selecting the bluetooth incoming terminal is performed by selecting a bluetooth terminal from a terminal list in a piconet or in a scatternet that can perform the direct voice telephone call.

17. The method of claim 15, further comprising mapping a selected incoming bluetooth terminal with a telephone number or inputting a telephone number.

18. The method of claim 15, further comprising applying a vocoder standard of a code division multiple access (CDMA) and a vocoder standard of a global system for mobile communication (GSM) of the bluetooth terminals.

19. The method of claim 15, further comprising adopting a bluetooth vocoder standard as an option.

20. The method of claim 15, further comprising transmitting a voice data packet through a voice field of a predetermined type in a packet.

21. The method of claim 20, wherein the voice data packet is transmitted through a voice or data field of a predetermined type in the packet.

22. The method of claim 15, further comprising transmitting from the outgoing bluetooth terminal a link management protocol (LMP) message to the incoming terminal simultaneously with the start of signaling for the DTMF signal.

23. The method of claim 15, wherein the SCO connection is made after the ACL layers of the outgoing and incoming bluetooth terminals are connected.

24. The method of claim 15, wherein the outgoing and incoming bluetooth terminals comprise a terminal in a piconet or scatternet in a bluetooth system.

25. The method of claim 15, wherein the bluetooth protocol stack only includes:
   an RF layer;
   a BB/LC layer;
   the ACL layer;
   the SCO layer;
   the LMP;
   a logical link control and adoption layer protocol; and
   an upper application layer.

26. The method of claim 15, further comprising releasing a connected call through processes that are reverse to establishing the communication channel.

* * * * *